May 13, 1952     J. G. A. RYDELL     2,596,726
WIND MOTOR Filed May 26, 1948     6 Sheets-Sheet 1

FIG. 1

INVENTOR
JOSEF G. A. RYDELL
BY
*Caswell + Lagaard*
ATTORNEYS

FIG. 5

May 13, 1952  J. G. A. RYDELL  2,596,726
WIND MOTOR
Filed May 26, 1948  6 Sheets-Sheet 6

INVENTOR
JOSEF G. A. RYDELL
BY
*Caswell & Lagaard*
ATTORNEYS

Patented May 13, 1952

2,596,726

UNITED STATES PATENT OFFICE 2,596,726

WIND MOTOR

Josef G. A. Rydell, Minneapolis, Minn.

Application May 26, 1948, Serial No. 29,386

5 Claims. (Cl. 170—1.5)

My invention relates to improvements in wind motors, particularly, though not exclusively for the propulsion of ships, an object of said invention being to provide a simple, durable and efficient mechanism adapted to convert energy from the wind for driving a ship's propeller and to obtain also the Magnus effect for the propulsion of the ship.

More specifically, it is an object of my invention to provide in mechanism of the instant nature a rotor in which two uprightly elongated vanes are curved transversely to render the same exteriorly convex and interiorly concave, and in which such vanes are juxtaposed with their concavities facing each other and are mounted for relative transverse movement, whereby such vanes may be registered with each other in cylinder-like formation and relatively offset reversely from such registering relationship.

Another object of the invention is to provide a rotor, as above, wherein each of the vanes includes a number of sail members mounted for relative movement telescopically to increase or diminish the effective height of such vane.

A further object of the invention is to provide a rotor, as above, having shift-means powered by the rotor for reversely shifting the vanes into and out of register and for shifting the sail members of said vanes telescopically, an additional object of the invention being to provide shift-means of such nature self-serving to secure the vanes and their telescoping sail members in positions into which they may be shifted by power derived from the rotor.

Other objects of the invention reside in the novel combination and arrangement of parts and in the details of construction hereinafter illustrated and/or described.

Figure 1:
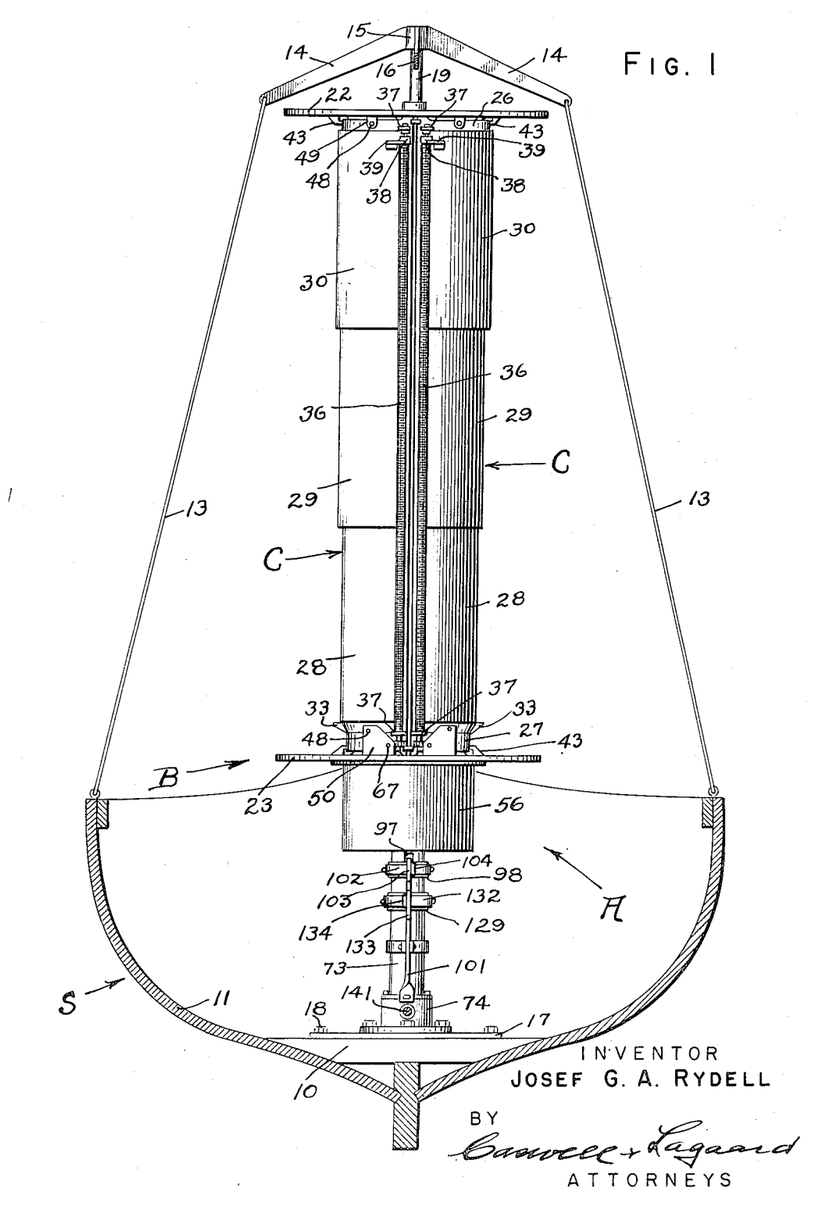
Fig. 1 is a view elevationally illustrating a form of wind motor constructed in accordance with my invention and showing also in transverse cross-section a ship to which said motor is applied.
Figure 2:
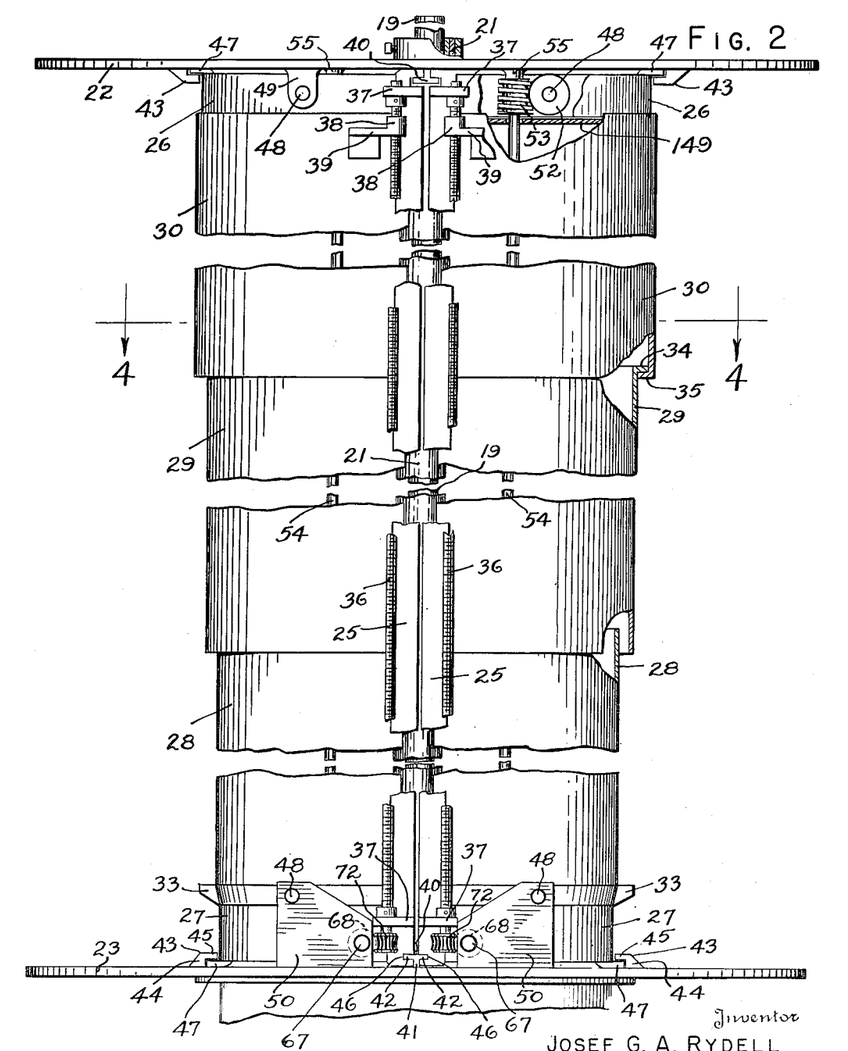
Fig. 2 is an elevational view in detail of the super-structure of the motor shown in Fig. 1.
Figure 3:
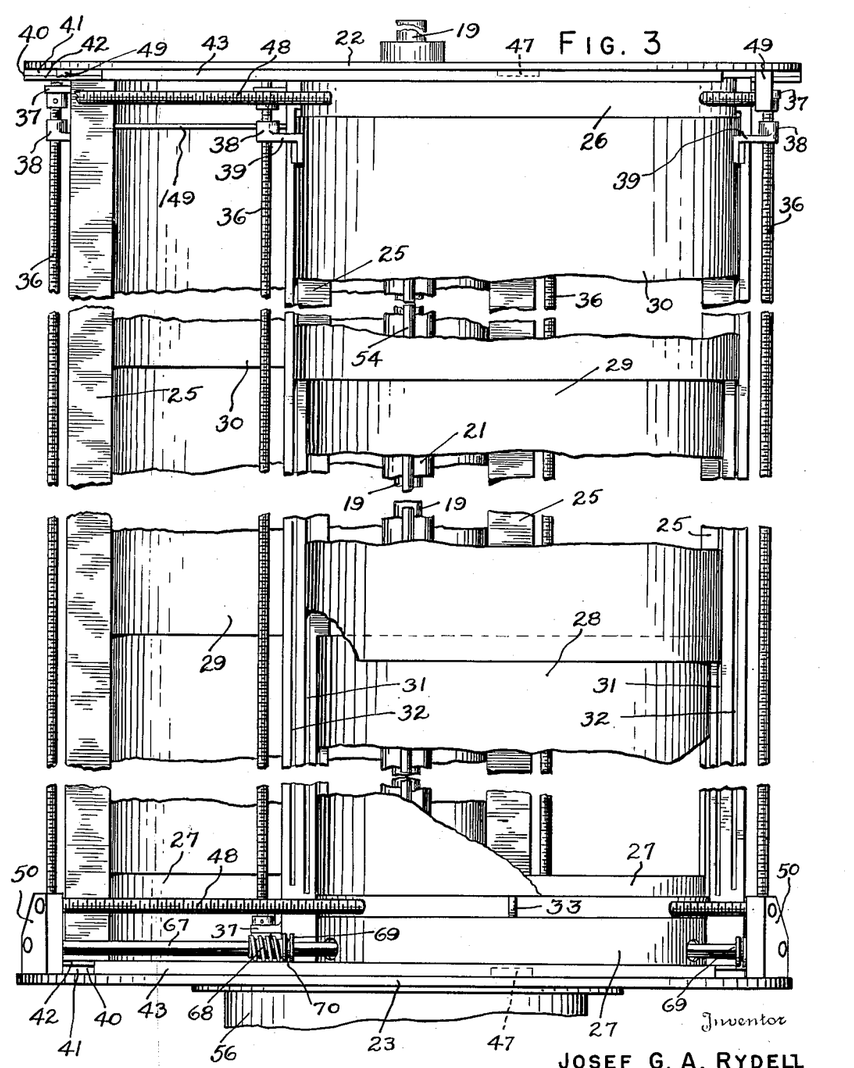
Fig. 3 is an elevational view portraying said super-structure as seen from an angle of ninety degrees from the elevation thereof shown in Fig. 2.

In the accompanying drawings, the illustrated embodiment of my improvement in wind motors is designated in its entirety by the reference character A. This motor is shown standing on a bed 10 constructed within the hull 11 of a ship S. For the purpose of holding the motor A erect relative to the ship S, stay-lines 13 are employed. Two of these stay-lines 13 are shown in Fig. 1, the same being anchored at their lower ends to the sides of the ship's hull 11 and fastened at their upper ends to side-wise extending arms 14 of a spider-bracket 15 at the crest of the motor A. Similar stay-lines (not shown) are anchored at their lower ends fore and aft of the ship and are fastened at their upper ends to arms 16 of said spider-bracket 15 extending lengthwise of said ship.

The motor A includes a base-plate 17, fastened to the ship's bed 10 by bolts 18 and a mast 19 socketed at its lower end in a boss 20 formed on said base-plate, said mast 19 being fitted at its upper end with said spider-bracket 15. Said motor A further includes a rotor B which turns freely about the mast 19. Principal parts of this rotor B include a tubular rotor-shaft 21 encircling the mast 19 and upper and lower disc-like endplates 22, 23 axially keyed to said rotor-shaft 21. The lower end of the rotor-shaft 21 rests upon an anti-friction thrust bearing 24 encircling the mast 19 and resting upon the upper end of the boss 20 on the base plate 17 in which said mast 19 is socketed. Additionally included in the rotor B to cause it to be turned by energy derived from wind, are two similar elongated transversely arcuate vanes C uprightly arranged between the end plates 22, 23 in juxtaposed position with their concavities facing each other. Each vane C has a frame c consisting of a pair of stiles 25 integrally formed at their upper portions with an upper rail 26 and at their lower portions with a lower rail 27, both of said rails 26, 27 being curved transversely of the frame. Each frame c carries a lower sail-panel 28, an intermediate sail-panel 29 and an upper sail-panel 30, all of sheet material arcuated transversely of the frame. The lower marginal portion of the lower sail-panel 28 overlaps and is secured to the upper marginal portion of the lower frame-rail 27. The marginal portions of said lower sail-panel 28 along its side edges are mortised into and secured to the stiles 25 of the vane-frame c. The corresponding side marginal portions of the intermediate sail-panel 29 and of the upper sail-panel 30 are slidably fitted into grooves 31, 32 in said stiles 25 to enable said sail-panels to be moved up and down on the stiles 25, said slidable connections between the sail-panels 29, 30 and stiles 25 being made in dove-tail fashion so that said sail-panels will be held fast to said stiles 25 in any of the vertically adjusted positions in which said sail-panels 29, 30 may be placed. The intermediate sail-panel 29 is arcuately shaped to telescope over the bottom sail-panel 28 and the upper sail-panel 30 is similarly shaped to telescope over said intermediate sail-panel 29. An ear 33 issuing radially outward from the lower frame-rail 27 forms a rest for the intermediate sail-panel 29, the lower edge of which abuts against said ear 33 in the lowermost position of said panel 29. Along the upper edge of the intermediate sail-panel 29 is an outwardly turned flange 34, the same being engageable with an inwardly turned flange 35 formed along the lower edge of the upper sail-panel 30. By reason of said inter-engaging flanges 34, 35, the intermediate sail-panel 29 is supported by said upper sail-panel 30, except at the lowermost position of said intermediate sail-panel 29 wherein it rests upon the ear 33 on the lower frame-rail 27 of the vane-frame c.

For each stile 25, each vane C has a lift-screw 36 closely paralleling its respective stile 25, each lift-screw 36 being revolubly supported at its upper and lower portions in brackets 37 issuing from the upper and lower portions of such stile 25. Threaded on each of the two lift-screws 36 of each vane C is a nut 38, the same being integrally formed with an arm 39 secured to the upper sail-panel 30 of such vane. Said nuts 38 in cooperation with the lift-screws 36 of their respective vane C cause the upper sail-panel 30 of such vane to be raised or lowered on the vane-frame c according to the direction of rotation of said lift-screws 36, which are turned in a manner hereinafter to be described.

The vanes C are slidably mounted on and between the end plates 22, 23 for sidewise movement transversely of the rotor B, said vanes being relatively juxtaposed with their concavities confronting each other. These vanes C are shiftable reversely to offset the same more or less relative to each other and to bring them into registry in the form of a cylinder coaxially disposed with respect to the rotor-shaft 21. To mount the vanes C slidably at their upper and lower ends on the upper and lower end-plates 22, 23, the following construction is employed. Disposed at the upper face of the lower end-plate 23 radially thereof are aligned central guide-rails 40, T-shaped in cross-section. The legs 41 of said guide-rails are fixed to said end-plate 23, the opposed outwardly extending head-flanges thereof constituting center tracks 42. Also disposed at the upper face of said lower end-plate 23 at opposite sides of said central guide-rails 40 and in parallelism therewith are a pair of additional guide-rails 43, L-shaped in cross-section, the legs 44 thereof being fixed to said end-plate 23. The bars or flanges of said last mentioned guide-rails 43 extend toward the central guide-rails 40 and provide outer tracks 45, each complementing its companion center track 42 on each of the central guide-rails 40. A corresponding arrangement of guide-rails 40 and 43 is provided at the lower surface of the upper end-plate 22. The inner, confronting edges of the upper and lower frame-rails 26, 27 of the vane C are formed with notches 46 therein in which said center tracks 42 are slidably received, and each of said upper and lower frame-rails 26, 27 is supplied with a follower-lug 47 medially thereof outwardly extending therefrom in opposition to said notches 46 therein. Each follower-lug 47 travels along its respective guide-rail 43 moving between the track 45 thereon and the upper or lower end-plate 22, 23 as the case may be, with the outer end of said lug 47 slidably abutting the inner face of the leg 44 of said rail 43. Thus, the two vane-frames c are slidably interlocked with and thereby movably mounted on the upper and lower end-plates 22, 23 for crosswise movement to and fro relative thereto.

Each of the vanes C is shifted into and held in one position or another along the central guide-rails 40 and its respective outer guide-rail 43 on the upper and lower end-plates 22, 23 by means of upper and lower horizontally disposed shift-screws 48, the upper shift-screw 48 being revolubly mounted at its ends in bearing blocks 49 on the upper end-plate 22 of such vane C and the lower shift-screw 48 being revolubly mounted at its ends in bearing blocks 50 on the lower end-plate 23. Said upper and lower shift-screws 48 of each vane C parallel the guide-rails 40, 43 and extend through the upper and lower frame-rails 26, 27 respectively, of such vane, each shift-screw 48 being threadedly interfitted with a nut 51 formed integrally with its respective frame-rail so that rotation of the two shift-screws 48 similarly in one direction or the other will shift the vane C one way or the other crosswise of the end-plates 22, 23 and so that in the absence of rotation of said two shift-screws 48, they will hold their respective vane C fixed against movement relative to said end-plates. Each shift-screw 48 of each vane C has a worm gear 52 fixed thereto and meshing with a companion worm gear 53 fixed to an upright countershaft 54 journaled at its upper end in a boss 55 depending from the upper end-plate 22. Each of said upright countershafts 54 extends through the lower end-plate 23 and into a transmission housing 56 depending from said lower end-plate 23, the lower end of such countershaft 54 being journaled in a thrust bearing 57 mounted on the bottom or lower end 58 of said housing 56. Transmission mechanism D, contained within the transmission housing 56 and later to be described in detail, includes a lower inside-outside annular gear 59 coaxially disposed with respect to the rotor-shaft 21, the external teeth of said gear 59 being in mesh with two spur gears 60, one of which is fixed to the upright countershaft 54 of one vane C, the other spur gear 60 being fixed to the upright countershaft 54 of the second vane C. Translating motion from said inside-outside annular gear 59, the spur gear 60 for each vane C causes the upright countershaft 54 thereof to rotate and with it the worm gears 53 thereon which, in turn, cause their companion worm gears 52 on the horizontal shift-screws 48 to rotate said shift-screws one way or the other and correspondingly shift such vane C.

For each vane C, there is a sleeve-shaft 61 in which the upright countershaft 54 for such vane is journaled. This sleeve-shaft 61 extends through and is itself journaled in the lower end-plate 23 and a boss 62 depending therefrom. On the lower end of the sleeve-shaft 61 beneath the boss 62 is a spur gear 63 which meshes with an upper inside-outside annular gear 64 of the transmission mechanism D. On the upper end of such sleeve-shaft 61 is a worm gear 65 meshing with a companion worm gear 66 fixed to a cross-shaft 67 medially thereof, such cross-shaft paralleling the shift-screw 48 and extending freely through the lower frame-rail 27 of the vane near the stiles 25 thereof. Like said shift-screw 48, said cross-shaft 67 is journaled at its ends in the bearing blocks 50 on the lower end-plate 23. Between each of said bearing-blocks 50 and the worm gear 66 on the cross-shaft 67, said cross-shaft is made square in transverse cross-section. Slidable, but not revoluble, on the angular portions of the cross-shaft 67 for each vane C are a pair of sliding worm gears 68 which are located at opposite sides of the lower frame-rail 27 of the vane. Each of said sliding worm gears 68 is provided with a flange 69 formed with an annular groove 70 wherein is received the outer end of a finger 71 which projects from the adjacent frame-stile 25 of the vane and causes the worm gear 68 to slide along the cross-shaft 67 correspondingly with the shifting of its respective vane C relative to the end-plates 22, 23. Each sliding worm gear 68 meshes with a companion worm gear 72 at the lower end of its respective lift-screw 36. The two lift-screws 36 for each vane C are turned through their respective meshing worm gears 68, 72, cross-shaft 67, their respective meshing worm gears 66, 65 and sleeve-shaft 61. Such turning of said shift-screws 36 acts to raise and lower the upper sail-panel 30 of their respective vane C and, through said upper sail-panel 30, to raise and lower the intermediate sail-panel 29. Said lift-screws 36 of each vane C additionally serve, in the absence of rotation thereof, to hold the upper sail-panel 30 in vertically adjusted position along with the intermediate sail-panel 29 in positions thereof in which said intermediate sail-panel is unsupported by the ears 33 on the lower frame-rail 27 of the vane.

Figure 5:
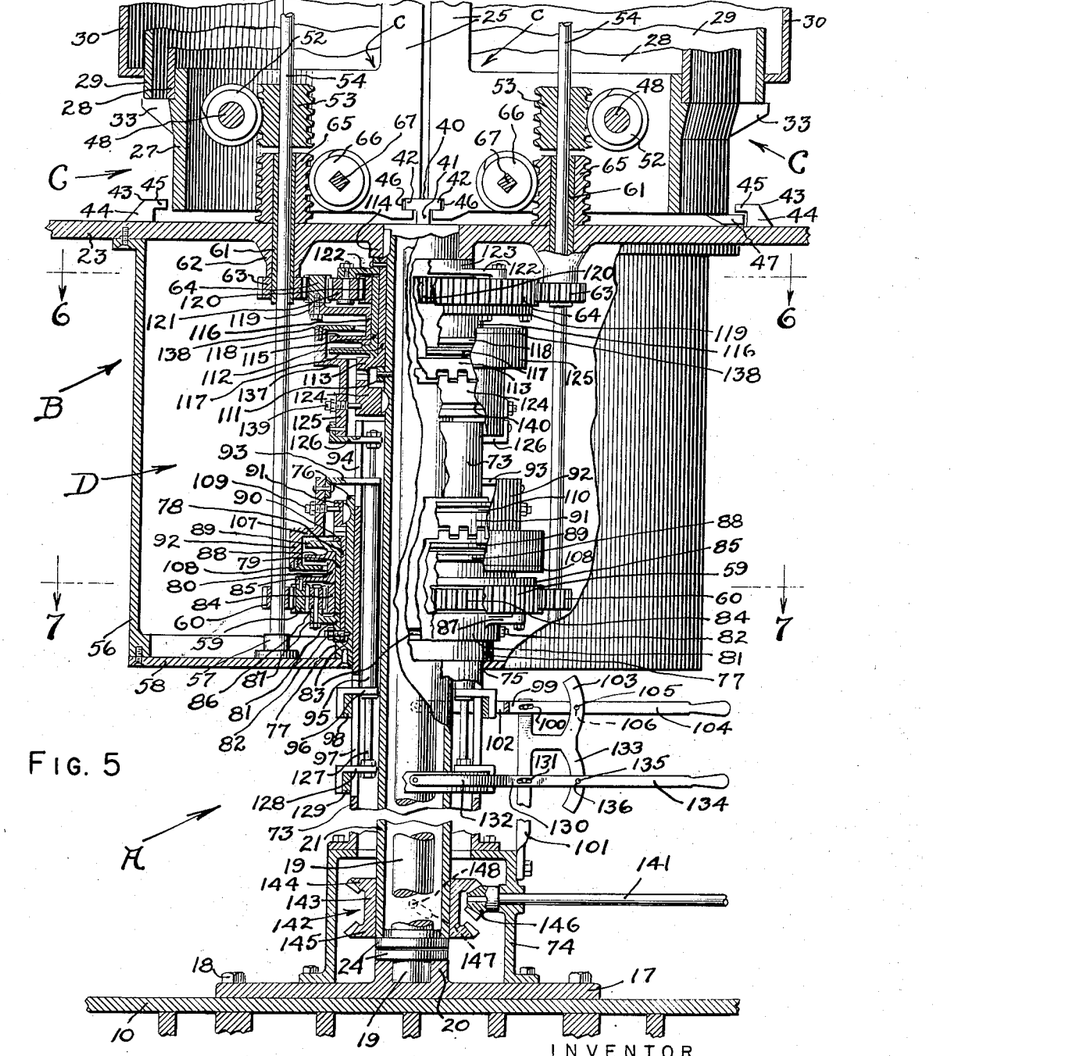
Fig. 5 is a detail view partly in elevation and partly in section illustrating the lower portion of the motor structure shown in Fig. 1.
Figure 6:
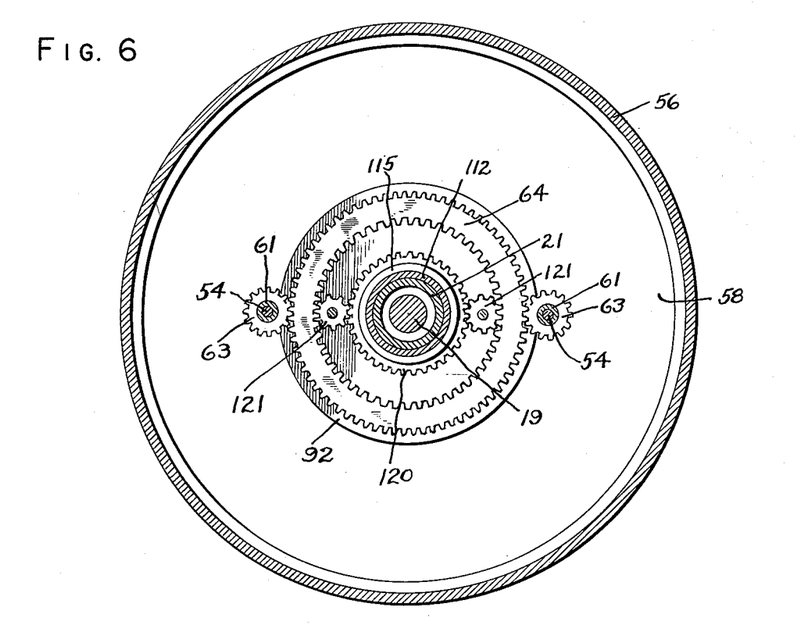
Fig. 6 is a detail sectional view taken as on the line 6—6 of Fig. 5.
Figure 7:
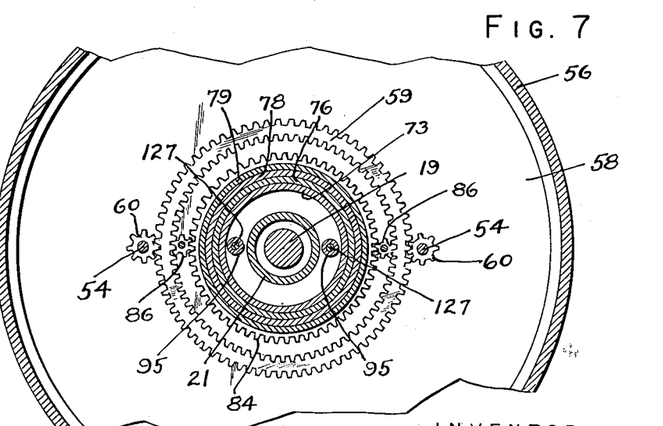
Fig. 7 is a detail sectional view taken as on the line 7—7 of said Fig. 5.

The power transmitting mechanism D employed to drive the upright countershaft 54 and sleeve-shaft 61 of each vane C includes the aforesaid inside-outside upper and lower annular gears 64, 59 and further includes a tubular post 73 encircling the rotor-shaft 21, said post 73 having its footing on and being bolted to a gear-case 74 enclosing the lower portion of said rotor-shaft 21. This gear-case 74, in turn, has its footing on and is bolted to the base-plate 17. Said tubular post 73 extends upwardly into the transmission housing 56 through an axial opening 75 in the bottom 58 thereof. Encircling the tubular post 73 within the housing 56 is a tubular mount 76 formed with a base-flange 77 bolted to the bottom 58 of said housing. An inner clutch-sleeve 78 encircling said tubular mount 76 is encircled by an intermediate sleeve 79 which, in turn, is encircled by an outer sleeve 80. The lower edge of the intermediate sleeve 79 rests upon a collar 81 which also encircles the inner clutch-sleeve 78. The lower edge of said collar 81 and the lower edge of said inner clutch-sleeve 78 bear upon the upper edge of the base-flange 77 on the tubular mount 76 for the support of the collar 81, and the intermediate sleeve 79 and the inner clutch-sleeve 78. Pins 82 extending through said collar 81 and inner clutch-sleeve 78 tie said collar and sleeve together and said pins project at their inner ends into an annular race-groove 83 in said tubular mount 76 to hold said collar 81 and inner clutch-sleeve 78 against upward movement on the tubular mount 76. An annular gear 84 is keyed to said intermediate sleeve 79, the upper edge thereof providing a rest for the lower edge of the outer sleeve 80. An outwardly extending annular flange 85 at the lower portion of said outer sleeve 80 over-reaches the upper edge of and carries the lower inside-outside annular gear 59, screws being employed to fasten said gear 59 to said flange 85. Meshing with the inner teeth of the lower inside-outside gear 59 and with the teeth of the annular gear 84 on the intermediate sleeve 79 are a number of idler-gears 86, each of which is revolubly supported by an arm 87 issuing from said collar 81. At the upper portion of the outer sleeve 80 is an annular friction-flange 88. A companion annular friction-flange 89 on the intermediate sleeve 79 rides the upper edge of the outer sleeve 80 and, in turn, is ridden by an annular flange 90 formed on the inner clutch-sleeve 78 and having upwardly extending teeth. Encircling the tubular mount 76 and feathered thereon above said flange 90 on clutch-sleeve 78 is a clutch-collar 91, having downwardly extending teeth designed to mesh with the upwardly extending teeth on said flange 90 of the clutch-sleeve 78. A lower stator-ring 92 encompassing the clutch-collar 91 and the friction-flanges 89, 88 on the intermediate and outer sleeves 79, 80 is supported by a pair of arms 93 each of which extends radially inward from said stator-ring 92, through a vertical guide-slot 94 in the upper portion of the tubular post 73 to the upper end of an upright supporting sleeve 95 located in an annular space between the rotor-shaft 21 and said tubular post 73. Said supporting sleeves 95 are secured to and their lower ends are carried by arms 96 extending outwardly through vertical guide-slots 97 formed in the tubular post 73 beneath the transmission housing 56, said arms 96 bearing at their outer ends on an annular rest 98 encircling said tubular post 73 and vertically slidable therealong. This annular rest 98 is shifted up and down and normally held in an intermediate position by means of a shift-lever 99 intermediately slidably fulcrumed, as at 100, on a bracket 101 upstanding from the gear-case 74, said shift-lever 99 having a yoke 102 at its inner end embracing the annular rest 98 and pivoted thereto on an axis diametrically thereof. This shift-lever 99 is releasably latched in an intermediate position correspondingly to locate said annular rest 98. An expedient for thus latching said shift-lever 99 includes an upright guide-quadrant 103 on said bracket 101 for the outer or handle portion 104 of the shift-lever 99. This guide-quadrant 103 has a latch-pin 105 issuing outwardly therefrom medially thereof. Formed in said handle portion 104 of the shift-lever 99 is an aperture 106 which may be registered with the latch-pin 105 by springing the handle portion 104 of the shift-lever 99 slightly sidewise. Thus registered with the latch-pin 105, said aperture 106 will receive said latch-pin when said handle portion 104 of said shift-lever 99 is allowed to spring back into its normal position. Said lower stator-ring 92 is formed to provide a downwardly facing annular friction-shoulder 107 which confronts the upper surface of the friction-flange 89 on the intermediate sleeve 79. An annular friction-plate 108 secured to the lower edge of the stator-ring 92 and made a part thereof provides an upwardly facing friction surface confronting the lower surface of the friction flange 88 on the outer sleeve 80. The distance between said friction shoulder 107 and friction-plate 108 on the stator-ring 92 is such that they are both spaced from their respective friction-flanges 88, 89 when said stator-ring 92 is held in vertically adjusted position as determined by the shift-lever 99 in its neutral intermediate latched position, as shown in Fig. 5. For adjusting the sliding clutch-collar 91 vertically, said stator-ring 92 is fitted with shiftpins 109 extending radially inward therefrom, the inner terminal portions of said pins 109 projecting into an annular groove 110 formed in said clutch-collar 91. These pins 109 serve to hold said clutch-collar 91 in the position shown in Fig. 5 when the shift-lever 99 occupies its said neutral, latched position. In such position of the clutch-collar 91, the teeth thereof mesh with the teeth on the clutch-sleeve 78 and deprive said clutch-sleeve of rotation. When the handle portion 104 of said shift-lever 99 is released from its latch-pin 105 and swung upwardly, the stator-ring 92 will be depressed to bring the friction shoulder 107 thereof against the friction-flange 89, such movement of said stator-ring 92 being accompanied with the lowering of said clutch-ring 91 and the deeper meshing of its teeth with the teeth of the clutch-sleeve 78. Swinging the handle portion 104 of shift-lever 99 downwardly beneath its latched, neutral position, the friction plate 108 on the stator-ring 92 is brought into engagement with the friction-flange 88 on the outer sleeve 80 and the clutch-collar 91 is lifted to free the teeth thereof from the teeth of the clutch-sleeve 78.

Encircling and pinned to the rotor-shaft 21, beneath the upper inside-outside gear 64, is a stop-collar 111. Surrounding said stop-collar 111 and resting on said stop-collar 111 is an inner clutch-sleeve 112 having at its lower end an annular flange 113 formed with downwardly extending teeth. The upper end of this clutch-sleeve 112 lies adjacent to the lower end of an axial boss 114 on the lower end-plate 23 of the rotor B, said boss forming an upper stop for said clutch-sleeve 112. An intermediate sleeve 115 encircles the clutch-sleeve 112 and, in turn, is encircled by an outer sleeve 116. At its lower end, said intermediate sleeve 115 rests on the flange 113 of the inner clutch-sleeve 112 and is formed with an annular friction-flange 117. Similarly, the outer sleeve 116 rests at its lower end on the friction-flange 117 of the intermediate sleeve 115 and is formed at such end thereof with an annular friction-flange 118. At its upper end, said outer sleeve 116 is formed with an annular supporting flange 119 upon the upper margin of which said inside-outside gear 64 is bolted. Encircling and fixed to the intermediate sleeve 115 is an annular gear 120 meshing with idler-gears 121 which also mesh with the internal teeth of the upper inside-outside gear 64. Said idler-gears 121 are carried on arms 122 integrally formed with a band 123 which encircles and is pinned to the upper portion of the clutch-sleeve 112. Encircling the rotor-shaft 21 and feathered thereon beneath the clutch-sleeve 112 is a clutch-collar 124 having upwardly extending teeth designed to mesh with downwardly extending teeth on the clutch-sleeve 112. An upper stator-ring 125 surrounds the friction-flanges 117, 118 on the intermediate and outer sleeves 115, 116, and also said clutch-collar 124. Arms 126 radially disposed relative to the tubular post 73 and guided vertically in the upper slots 94 in said post 73 are pinned at their outer ends to the stator-ring 125 and support the same. Said arms 126, in turn, are supported at their inner ends by the upper ends of upright actuating rods 127. These actuating rods 127 are slidably accommodated medially thereof within the upright actuating sleeves 95 and are secured at their lower ends to the inner ends of arms 128 slidably guided vertically in the lower guide-slots 97 of the tubular post 73. At their outer ends, these arms 128 bear upon an annular rest 129 encircling said post. This annular rest 129, like the annular rest 98 above it, is vertically slidable along said post 73, the same being shifted up and down and normally held in an intermediate position by means of a shift-lever 130 intermediately slidably fulcrumed, as at 131, on the upstanding bracket 101, said shift-lever having a yoke 132 at its inner end embracing the annular rest 129 and pivoted thereto on an axis diametrically thereof. Said shift-lever 130 is releasably latched in an intermediate position correspondingly to locate said annular rest 129. For latching said shift-lever 130 in such position, the bracket 101 is supplied with a depending guide-quadrant 133 for the handle portion 134 of said shift-lever 130. This guide-quadrant 133 has a latch-pin 135 issuing outwardly therefrom medially thereof. Formed in said handle portion 134 of the shift-lever 130 adjacent said guide-quadrant 133 is an aperture 136 which may be registered with the latch-pin 135 upon springing the lever 130 slightly sidewise. Having thus registered said aperture 136 with said latch-pin 135, the shift-lever 130 may be allowed to spring back into normal position with said pin 135 received within said aperture 136. Said upper stator-ring 125 is formed to provide an upwardly facing friction-shoulder 137 which confronts the lower surface of the friction-flange 117 on the intermediate sleeve 115. An annular friction plate 138 screwed to the upper edge of the stator-ring 125 and thus made a part thereof provides a downwardly facing friction surface confronting the upper surface of the friction-flange 118 on the outer sleeve 116. The distance between said friction shoulder 137 and friction-plate 138 on said upper stator-ring 125 is such that they are both spaced from their respective friction-flanges 117, 118 when said stator-ring is held in vertically adjusted position as determined by the shift-lever 130 in its neutral, latched position, as shown in Fig. 5. To adjust the clutch-collar 124 vertically, the stator-ring 125 is supplied with shiftpins 139 extending radially inward therefrom and projecting into an annular groove 140 in said collar 124. Through the media of said shift-pins 139, the clutch-collar 124 is held supported in the position shown in Fig. 5 when the shift-lever 130 is in its said neutral, latched position. In such position of said clutch-collar 124, the teeth thereof are meshed with the teeth on the clutch-sleeve 112 to deprive said clutch-sleeve of rotation about the rotor-shaft 21. With the handle portion 134 of the shift-lever 130 released from its latch-pin 135 and swung downwardly, said upper stator-ring 125 will be elevated to bring the friction shoulder 137 thereof against the friction-flange 117 on the intermediate sleeve 115, such movement of said stator-ring 125 being accompanied with the elevation of said clutch-ring 124 and the deeper meshing of the teeth thereof with the teeth of the clutch-sleeve 112. Swinging the handle portion 134 of the shift-lever 130 upwardly above its latched, neutral position, the friction-plate 138 on the stator-ring 125 is brought into engagement with the friction-flange 118 on the outer sleeve 116 and the clutch-collar 124 is depressed to free the teeth thereof from the teeth of the clutch-sleeve 112.

Assuming that the two vanes C of the rotor B are relatively offset and that the shift-levers 99, 130 are disposed in their neutral, latched position, as shown in the drawings, the wind will be caught by the vanes C in the concavities thereof and the rotor B will be turned by the force of such wind in one direction or the other depending upon which way said vanes are relatively offset. And, in such case, the revoluble parts of the transmission mechanism D will be inactive, merely turning as a unit with the rotor B proper.

Power from the rotating rotor B is transmitted to a propeller shaft 141 having thereon a submerged propeller (not shown) for driving the ship S, and this translation of power is effected in a manner whereby said propeller shaft is caused to turn always in the same direction regardless of the direction in which the rotor B may turn. In the accomplishment of such and, there is mounted on the lower end of the rotor-shaft 21 a dual gear 142 including a hub 143 having a limited sliding and turning movement relative to said rotor-shaft 21. Integrally formed with said hub 143 at top and bottom thereof are opposed bevel gears 144, 145 either of which is singly engageable with a bevel gear 146 keyed to the propeller shaft 141. Said hub 143 of the dual gear 142 is formed with diametrically opposed slots 147 extending obliquely relative to the hub's axis. Fins 148 arranged radially relative to the hub 143 and anchored at their inner ends to the rotor-shaft 21 extend into said oblique slots 147 in said hub 143. This pin-and-slot connection between the dual gear 142 and the rotor-shaft 21 acts, upon rotation of said rotor-shaft in one direction, to depress the dual gear 142 and engage the upper bevel gear 144 thereof with the gear 146 on the propeller shaft 141. And, upon rotation of said rotor-shaft 21 in the opposite direction, said pin-and-slot connection acts to elevate the dual gear 142 and bring the lower bevel gear 145 thereof into mesh with said gear 146 on said propeller shaft 141. Thus, regardless of the direction of rotation of the rotor-shaft 21, the propeller shaft 141 will turn constantly in the same direction.

In employing my improved wind motor in a ship, it is contemplated that the propulsive force derived from the submerged propeller (not shown) on the propeller shaft 141 be augmented by taking the greatest practical advantage of the familiar Magnus effect produced by the spinning rotor B. To attain such advantage of the Magnus effect, under changes in direction of the wind with respect to a given course to be followed by the ship, it will be necessary to reverse the offset relationship of the vanes C and, too, it will be desirable, in accordance with the force of the wind and other considerations, to offset the vanes C relatively more or less. In coming into dock, riding at anchor, riding out a gale and the like when propulsive force, arising from the propeller and the Magnus effect of the rotor is not desired, the relative offsetting of the vanes C will be eliminated by bringing them together into the form of a cylinder, thereby to deprive said vanes of their normal rotor-turning effect and thus allow the rotor to come to rest. This relative adjustment of the vanes C is accomplished through said transmission mechanism D by power developed from the revolving rotor B. For example, assume that the rotor B is being turned by the wind in either direction and that the vanes C are to be brought more nearly into register, or into registry coaxially with the rotor-shaft 21, or reversely offset, the handle portion 104 of the upper shift-lever 102 will be disengaged from the latch-pin 105 and swung downward to lift the lower stator-ring 92. This lifting of said stator-ring 92 disengages the clutch-collar 91 from the inner clutch-sleeve 78 and brings the friction-plate 108 of said stator-ring 92 against the friction-flange 88 of the outer sleeve 80 with the result that the lower inside-outside annular gear 59 is frictionally held against rotation. Thereupon, the spur gears 60, meshing with the outer teeth of said lower inside-outside gear 59 are caused to rotate and turn the upright countershafts 54, each in the same direction. These countershafts 54, through the worm gears 53, 52, drive the horizontal shift-screws 48, the threads of which are so formed that they cause their respective vanes C to be equally but oppositely shifted on the end-plates 22, 23. Returning the upper shift-lever 99 to its intermediate, latched position the neutrality of the transmission mechanism D is restored and the vanes C stand in their newly adjusted positions locked against sidewise movement by the horizontal shift-screws 48. To accomplish a reversal of the relative sidewise movement of the vanes C, as last above described, the handle portion 104 of the shift-lever 99 is freed from the latch-pin 105 and swung upward from its normal intermediate position. This movement of said shift-lever 102 depresses the lower stator-ring 92 bringing the friction shoulder 107 against the friction-flange 89 with the teeth of the clutch-collar 91 engaged with the teeth of the clutch-sleeve 78. In this situation, the annular gear 84 on the intermediate sleeve 79 is held against rotation, while the idler-gears 86, tied to the inner clutch-sleeve 78, have a planetary motion around the axis of the rotor-shaft 21, along with rotation about their own axes with the result that the lower inside-outside gear 59 is turned to impart rotation to the spur gears 60 and the upright countershafts 54 in direction counter to that first described, whereby the relative sidewise movement of the vanes C, as first described, is reversed. Thus, by merely manipulating the shift-lever 99, the vanes C of the revolving rotor B may be brought into registry with each other coaxially of the rotor-shaft 21 by power derived from the rotor itself, or may be relatively offset reversely more or less, to accord with the existing sailing conditions and the extent to which advantage is desired to be taken of the Magnus effect available in said rotor construction.

Figure 4:
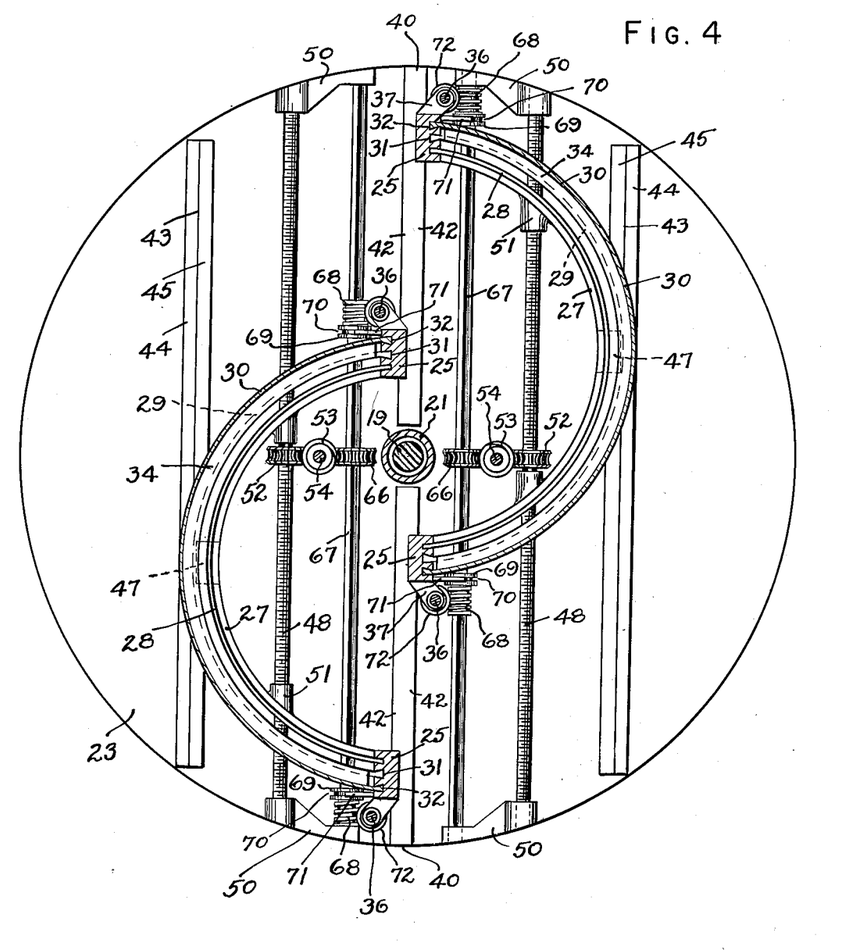
Fig. 4 is a transverse sectional view of the structure shown in Figs. 2 and 3, said view being taken as on the line 4—4 of Fig. 2.

At the same time that the transmission mechanism D is being employed to shift the vanes C sidewise, or at a different time as may be desired, said transmission mechanism may be further employed to raise or lower the upper and intermediate sail-panels 30, 29 of the vanes C on the rotating rotor B, thereby to attain the full effect of the entire sail area afforded by said vanes, or the lesser effect of a reduced sail area, as may be desired under the particular conditions prevailing. To this end, and assuming that the rotor B is turning in a clockwise direction as seen in Fig. 4, the handle portion 134 of the lower shift-lever 130 will be freed from the latch-pin 135 and swung upwardly from the intermediate, neutral position thereof shown in Fig. 5. This movement of said shift-lever 133 depresses the upper stator-ring 125 freeing the clutch-collar 124 from the inner clutch-sleeve 112 and bringing the friction-plate 138 on the said upper stator-ring 125 against the friction-flange 118 on the outer sleeve 116 with the result that the upper inside-outside annular gear 64 is frictionally held against rotation about the axis of the rotor-shaft 21. Thus held, said inside-outside gear 64 drives the spur gears 63 on the sleeve-shafts 61 which, in turn, drive the lift-screws 36 through the worm gears 65, 66, cross-shafts 67 and worm gears 68, 72 in a direction synchronously to elevate the upper sail-panels 30 of the two vanes C and likewise the intermediate sail-panels 29 when the flanges 34 thereof are caught by the flanges 35 of the ascending upper sail-panels 30. When said sail-panels 30, 29 of the vanes C have been extended fully or as high as desired, the handle portion 134 of the shift-lever 130 is lowered to its intermediate, neutral position and caught on the latch-pin 135. To telescope the sail-panels 30, 29 more or less, the handle portion 134 of the shift-lever 130 is freed from the latch-pin 135 and swung downwardly from its said intermediate neutral position. This movement of said shift-lever 130 causes the friction-shoulder 137 of the stator-ring 125 to engage the friction-flange 117 on the intermediate sleeve 115, whereby the annular gear 120, also on said sleeve 115, is held against rotation. The clutch-collar 124, feathered to the revolving rotor-shaft 21 and meshed with the clutch-sleeve 112, causes said clutch-sleeve to turn and impart to the idler-gears 121 a planetary movement about the axis of the rotor-shaft 21. The upper inside-outside gear 64, carried on the now freed outer sleeve 116 is turned by the idler-gears 121 as they rotate about their own axes, the turning of said upper inside-outside gear 64 causing the spur gears 63 on the sleeve-shafts 61 to be rotated in a direction counter to the direction first described for lifting the panels 30, 29. Thus, the upper and intermediate sail-panels 30, 29 of each vane C will be lowered by the action of the lift-screws 36 to their full extent or short thereof depending upon the speed of the rotor B and the interval during which the shift-lever 130 is held in its downwardly swung position. Having caused the sail-panels 30, 29 to be lowered, as desired, the handle portion 134 of the shift-lever 130 is swung to return it to its intermediate, latched position, whereupon said upper inside-outside gear 64 turns without effect. In the event that the positions of the vanes C as seen in Fig. 4, are reversed to turn the rotor B in a counter-clockwise direction, the swinging of the handle portion 134 of the lower shift-lever 130 will be the reverse of that above described for either raising or lowering the sail-panels 30, 29 of said vanes C. When the sail-panels 30, 29 of the vanes C are lowered from their fully upwardly extended positions, the wind is kept from spilling out of each of said vanes at the upper end of its upper sail-panel 30 by reason of the employment of a semi-circular cap-plate 149 fitted thereinto.

In the illustrated embodiment of my invention, the mast 19 is shown within the rotor-shaft 21 which is of tubular formation to accommodate said mast therewithin. However, it will be understood that the rotor B may be supported in upright position by any suitable means such as a mast or masts standing alongside the rotor and suitably braced relative to the hull 11 of the ship.

From the foregoing it will be seen that I have provided a relatively simple, durable and efficient motor adapted to convert energy from the wind for any purpose, and in which the relative disposition of the vanes and the area of the vane surfaces may be quickly and easily altered simultaneously or at different times, under power produced by the motor, to meet the changing conditions in the use thereof. Also, it will be seen that my invention in wind motors as applied to a ship is particularly adaptable to such use by reason of the dual functioning thereof in the propulsion of the ship, the one function residing in the conversion of energy from the wind to drive a submerged propeller, and the other function residing in the utilization of the Magnus effect as an additional propulsive force. Further, it will be appreciated that a ship fitted with one or more wind motors in embodiment of my invention may be easily and efficiently maneuvered by relatively few hands and otherwise operated at relatively small cost.

Changes in the specific form of my invention, as herein described, may be made within the scope of what is claimed without departing from the spirit of my invention.

Having described my invention, what I claim as new and desire to protect by Letters Patent is:

1. In a wind motor, a rotor including an upright revoluble rotor-shaft, upper and lower end-plates secured to said rotor-shaft, tracks on the confronting faces of said end-plates, a pair of elongated, upright transversely arcuate vanes disposed between said end-plates in juxtaposed position with their concavities facing each other, each vane including a frame consisting of upper and lower arcuate rails and a pair of stiles, the frames cooperating with said tracks to guide the vanes for relative transverse movement bringing them into registry with one another coaxially with respect to said rotor-shaft and reversely offsetting the same from such position of registry, each vane having a bottom sail-panel of sheet material arcuated transversely and secured along its lower portion to the lower frame-rail thereof and along its end portions to the stiles, a second similarly arcuated sail-panel slidably mounted at its ends on said stiles and movable from a depressed position telescoped about said bottom sail-panel to an elevated position in upward extension thereof, and a third arcuated sail-panel slidably mounted at its ends on said stiles and movable from a depressed position telescoped about said second sail-panel in its depressed position to an elevated position in upward extension of the elevated second panel, a coupling member at the lower edge of said third sail-panel and a companion coupling member at the upper edge of said second sail-panel cooperating to cause said second sail-panel to be carried by said third sail-panel when the latter is fully extended relative to the former, an upright lift-screw revolubly mounted on the frame, a nut secured to said third sail-panel and fitting the lift-screw to raise and lower said third panel upon rotation of said lift-screw, a horizontal shift-screw adjacent the face of one of said end-plates, revolubly mounted thereon, and threadedly interfitted with the frame to move the frame along its tracks, panel-shifting mechanism for reversely turning the lift-screws of said vanes, and frame-shifting mechanism for reversely turning the shift-screws thereof, each of said shifting mechanisms including parts revoluble with and driven by said rotor-shaft and including other relatively stationary parts and means associated with said latter parts for actuating and causing said first mentioned parts to effect the turning of their respective screws during rotation of the rotor in either direction.

2. In a wind motor, a rotor including a revoluble rotor-shaft, a pair of vanes supported thereon and reversely movable relative thereto in opposition to each other, shift-mechanism driven by the rotor-shaft and coacting with said vanes to move the same, said shift-mechanism including a sleeve-like mount coaxially disposed relative to the rotor-shaft and revoluble therewith, a clutch-sleeve journaled on said mount and a clutch-collar feathered thereon for coaction with said clutch-sleeve, an intermediate sleeve journaled on the clutch-sleeve, an annular gear and an annular friction-flange on said intermediate sleeve, an outer sleeve journaled on the intermediate sleeve and having thereon an annular friction-flange, an annular inside-outside gear carried by the outer sleeve, idler-gears carried by the clutch-sleeve and meshing with said annular gear and with said inside-outside gear internally thereof, an axially shiftable stator-ring coaxially disposed relative to said rotor-shaft and connected with said clutch-collar correspondingly to shift the same, said stator-ring having axially spaced shoulders thereon, one for frictional engagement with the friction-flange on the outer sleeve and one for frictional engagement with the friction-flange on the intermediate sleeve, both of said shoulders being free from their respective friction-flanges in an intermediate position of said stator-ring, actuating means for shifting the stator-ring from its said intermediate position in one direction to engage one of its shoulders with the friction-flange on the outer sleeve and to disengage the clutch-collar from said clutch-sleeve, thereby to hold the inside-outside gear against rotation relative to the rotor-shaft, said actuating means being further adapted to shift the stator-ring in the other direction from its said intermediate position to engage the other of its shoulders with the friction-flange on the intermediate sleeve while maintaining said clutch-collar in engagement with the clutch-sleeve, thereby to cause the rotation of said inside-outside gear relative to said rotor-shaft, and a gear-train for each vane, each gear-train being geared to said inside-outside gear and adapted to move its respective vane in one direction or the other in synchronism with the companion vane and in opposition thereto according to the status rotatively of said inside-outside gear relative to said rotor-shaft.

3. In a wind motor, a rotor including a revoluble rotor-shaft, a pair of vanes, means on said rotor-shaft supporting said vanes, each vane including sail-panels, one thereof being movable telescopically relative to another thereof to vary the sail area of the vane, shift-mechanism energized by the rotating rotor for so moving the movable sail-panels of said vanes, said shift-mechanism including a clutch-sleeve journaled on the rotor-shaft and a clutch-collar feathered thereon for coaction with said clutch-sleeve, an intermediate sleeve journaled on the clutch-sleeve and having thereon an annular gear and an annular friction-flange, an outer sleeve journaled on the intermediate sleeve and having thereon an annular friction-flange, an annular inside-outside gear carried by the outer sleeve, idler-gears carried by the clutch-sleeve and meshing with said annular gear and with said inside-outside gear internally thereof, an axially shiftable stator-ring coaxially disposed relative to said rotor-shaft and connected with said clutch-collar correspondingly to shift the same, said stator-ring having axially spaced shoulders thereon, one for frictional engagement with the friction-flange on the outer sleeve and one for frictional engagement with the friction-flange on the intermediate sleeve, both of said shoulders being free from their respective friction-flanges in an intermediate position of said stator-ring, actuating means for shifting the stator-ring from its said intermediate position in one direction to engage one of its shoulders with the friction-flange on the outer sleeve and to disengage the clutch-collar from said clutch-sleeve, thereby to hold the inside-outside gear against rotation relative to the rotor-shaft, said actuating means being further adapted to shift the stator-ring in the other direction from its said intermediate position to engage the other of its shoulders with the friction-flange on the intermediate sleeve while maintaining said clutch-collar in engagement with the clutch-sleeve, thereby to cause the rotation of said inside-outside gear relative to said rotor-shaft, and a gear-train for each vane, each gear-train being geared to said inside-outside gear and adapted to move its respective movable sail-panel in one direction or the other similarly and in synchronism with the movable sail-panel of the companion vane according to the status rotatively of said inside-outside gear relative to said rotor-shaft.

4. A ship propelling motor adapted to convert energy from the wind to drive the ship's propeller shaft and also to obtain the Magnus effect for moving the ship, said motor including a rotor consisting of a support revoluble about a vertical axis and operatively connected with the propeller shaft to turn the same, two similar vertically elongated juxtaposed vanes, arcuate in transverse cross-section, mounted on said revoluble support at opposite sides of the axis thereof with the concavities of the vanes facing each other, said vanes being oppositely transversely movable on said support to reversely offset the one thereof more or less from the other, each vane comprising a frame and a number of sail panels mounted thereon, at least one of said sail panels being vertically movable with respect to another of said sail panels to vary the effective height of the vane, vane shifting means operatively connected with the frames of said vanes and with said revoluble support, said vane shifting means being energized by the rotating support and adapted to move said vanes on said support, panel shifting means operatively connected with said movable sail panels and with said revoluble support, said panel shifting means being also energized by the rotating support and adapted to move said movable sail panels on the frames of said vanes.

5. A motor adapted to be energized by the wind and including a rotor consisting of a revoluble support constituting a driving element, two similar elongated juxtaposed vanes, arcuate in transverse cross-section, mounted on said revoluble support at opposite sides of the axis thereof with the concavities of the vanes facing each other, said vanes being oppositely transversely movable on said support to reversely offset the one thereof more or less from the other, each vane comprising a frame and a number of sail panels mounted thereon, at least one of said sail panels being movable axially of the revoluble support relative to another of said sail panels to vary the effective sail area of the vane, vane shifting means operatively connected with the frames of said vanes and adapted to move the vanes on said revoluble support during rotation thereof, and panel shifting means operatively connected with said movable sail panels and adapted to move the same on the frames of said vanes during rotation of the revoluble support.

JOSEF G. A. RYDELL.

REFERENCES CITED

The following references are of record in the file of this patent:

UNITED STATES PATENTS

| Number | Name | Date |
|---|---|---|
| Re. 18,122 | Flettner | July 7, 1931 |
| 871,774 | Belitz | Nov. 26, 1907 |
| 1,640,891 | Fritzel | Aug. 30, 1927 |
| 1,650,702 | Folmer | Nov. 29, 1927 |
| 1,697,574 | Savonius | Jan. 1, 1929 |
| 1,834,558 | Wander | Dec. 1, 1931 |
| 1,922,866 | Rosenberg | Aug. 15, 1933 |
| 2,145,413 | Belfield | Jan. 31, 1939 |
| 2,326,757 | Casiple | Aug. 17, 1943 |
| 2,403,899 | Ammen | July 16, 1946 |

FOREIGN PATENTS

| Number | Country | Date |
|---|---|---|
| 403,416 | Germany | Sept. 29, 1924 |